July 31, 1934.  G. HANSEN  1,968,202

REFRACTOMETER

Filed Jan. 19, 1934

Inventor:

Gerhard Hansen.

Patented July 31, 1934

1,968,202

UNITED STATES PATENT OFFICE 1,968,202

REFRACTOMETER

Gerhard Hansen, Jena, Germany, assignor to firm Carl Zeiss, Jena, Germany

Application January 19, 1934, Serial No. 707,379
In Germany January 20, 1933

1 Claim. (Cl. 88—14)

An application has been filed in Germany, January 20, 1933.

The invention concerns a refractometer which comprises an objective and a scale, the scale being disposed on a surface of a glass body and used for the determination of the position of the boundary line of the total reflexion effected by the object to be examined.

The invention provides that the said surface conforms to the image-field curvature of the objectives generally used in refractometers and thus overcomes the disadvantage inherent in similar known refractometers having plane scales, which consists in this that the observer at the eye-piece is not offered the view of sharp images of the scale and the boundary line of the total reflexion simultaneously in the entire field of view and, consequently, has to put up with an undesired parallax that arises when he is reading the scale.

It is especially advantageous to have one surface of the eye-piece curved in such a manner that it may be provided with the scale. When the eye-piece consists of a plurality of parts cemented together, it is advisable to so construct one cemented surface of this member that the scale may be disposed on this surface.

The accompanying drawing represents the optical systems of two refractometers constructed according to the invention. The optical system according to Figure 1 forms part of an immersion refractometer for measuring the refractive indices of liquids, and that according to Figure 2 belongs to a refractometer for measuring the refractive indices of crystals. Figure 3 illustrates the form and position of the scale in the field of view of the two refractometers.

Figure 1:
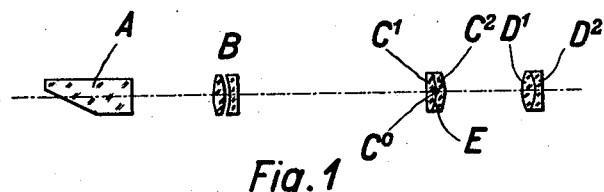

The immersion refractometer according to Figure 1 contains the following optical members: a prism A, an objective B having a curved image-field, and an eye-piece consisting of two lens members, the front member comprising two parts $C^1$ and $C^2$ cemented together and the rear member being composed of two parts $D^1$ and $D^2$ cemented together. The cemented surface E of the front lens member $C^1$, $C^2$ has such a radius of curvature and such a position that it coincides with the curved image-field of the objective B. The rear surface of the part $C^1$ of the lens member $C^1$, $C^2$, which is cemented to the front surface of the part $C^2$, has a scale $C^0$ on which the position of the boundary line of the total reflexion of the liquid to be examined may be read.

Figure 2:
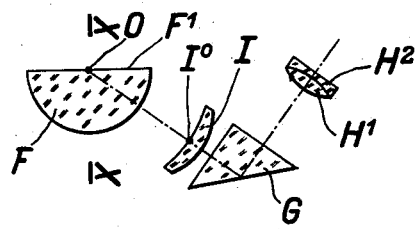
Figure 3:
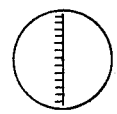

The refractometer according to Figure 2 contains the following optical members: a hemispherical body F, which is assumed to be rotatable about its axis of symmetry X—X and represents the objective of the refractometer, the plane surface $F^1$ of this body supporting the crystal to be examined, and an eye-piece consisting of two lens members whose axis is deflected by a prism G. The rear lens member comprises two parts $H^1$ and $H^2$ cemented together, and the front lens member I consists of one part only. That surface of the lens member I which is in the rear and faces the hemispherical body F is concentric to the center O of the body F and coincides with the image field of this body. The said surface is provided with a scale $I^0$ on which the position of the boundary line of the total reflexion of the crystal to be examined may be read.

I claim:

A refractometer comprising an objective and an eye-piece, one member of the eye-piece consisting of a plurality of parts cemented to each other, one cemented surface of this member being curved according to the image-field curvature of the objective, a scale being provided on this surface and adapted to be used for the determination of the position of the boundary line of the total reflexion effected by the object to be examined.

GERHARD HANSEN.